United States Patent [19]

Brown

[11] Patent Number: 5,412,858
[45] Date of Patent: May 9, 1995

[54] METHOD OF ENCASING BUNDLES OF TUBES

[76] Inventor: Colin Brown, Kookaburra Lodge, 1 Tylers Close, Edith Weston, Oakham, Rutland, Leicestershire, United Kingdom

[21] Appl. No.: 17,499

[22] Filed: Feb. 8, 1993

Related U.S. Application Data

[63] Continuation-in-part of Ser. No. 298,672, Jan. 19, 1989, abandoned, and a continuation-in-part of Ser. No. 578,274, Sep. 6, 1990, abandoned.

[30] Foreign Application Priority Data

Jan. 19, 1988 [GB] United Kingdom ............... 8801109

[51] Int. Cl.⁶ .............................................. B23P 15/00
[52] U.S. Cl. ........................................ 29/450; 29/433
[58] Field of Search ............. 29/450, 235, 433, 508, 29/514, 516; 138/111; 222/146, 318; 254/134.4; 99/275

[56] References Cited

U.S. PATENT DOCUMENTS

| | | |
|---|---|---|
| 294,500 | 3/1884 | Patterson ................. 254/134.3 R |
| 2,831,656 | 4/1958 | Grieve ..................... 254/134.4 |
| 3,050,786 | 8/1962 | St. John et al. . |
| 3,590,855 | 7/1971 | Woollen ................... 138/111 |
| 4,529,009 | 7/1985 | Horner et al. ............. 138/111 |
| 4,686,755 | 8/1987 | Jensen ..................... 29/450 |
| 4,783,054 | 11/1988 | Morel et al. .............. 254/134.4 |

FOREIGN PATENT DOCUMENTS

| | | |
|---|---|---|
| 079787 | 5/1983 | European Pat. Off. . |
| 145831 | 6/1984 | European Pat. Off. . |
| 2084606 | 12/1971 | France . |
| 2123515 | 2/1984 | United Kingdom . |
| 2188695 | 3/1986 | United Kingdom . |

*Primary Examiner*—Irene Cuda
*Attorney, Agent, or Firm*—Charles J. Brown

[57] ABSTRACT

A method of making a python in which a bundle of tubes is disposed coaxially within a close-fitting elongated sheath having a resiliently expandable inside diameter wherein the inside diameter is expandable by creating a pressure differential between the inside and the outside of the sheath to expand the sheath and inserting the tube bundle without substantial resistance from sliding contact with the expanded inside surface of the sheath, a pig being provided on the lead end of the bundle to assist passage through the sheath.

7 Claims, 6 Drawing Sheets

FIG.11

METHOD OF ENCASING BUNDLES OF TUBES

CROSS REFERENCE TO RELATED APPLICATION

This application is a continuation-in-part of my parent application entitled "Method of Making a Python (As Amended)" filed Jan. 19, 1989 and given Ser. No. 07/298,672 now abandoned and my copending first continuation-in-part application entitled "Method of Encasing Bundles of Tubes" filed Sep. 6, 1990 and given Ser. No. 07/578,274.

BACKGROUND OF THE INVENTION

This invention relates to methods of making a python, that is to say a bundle of tubes encased in a foam sheath such as is used for the conveyance of beverages from cellar or cool store to a dispensing point such as a bar or soft drinks counter.

Such bundles of tubes are required to be of surprisingly substantial length, and are used normally in lengths up to and exceeding 100 meters. The tube bundles are sheathed in a foam insulating material so as to maintain their low temperature up to the dispensing point, where they may need "flash" cooling or maybe heating immediately prior to dispensing in order to be served at the correct temperature.

The tube bundles, of "food grade" plastics material for the conveyance of beverages and such additional "service", e.g. coolant tubes such as may be required, are assembled into a bundle and wrapped, usually in a cling-film material. The bundles are assembled to particular requirements, some at least being standard or substantially so by virtue of their being widely specified by brewery chains or like enterprises.

As described in GB 2 166 833A, great difficulties are experienced in fitting the foam sheath onto the bundle of tubes. The practice of lubrication using talc is said there to be undesirable, but another problem is said to be that only short lengths of sheath can be pulled over the tube bundle, each length requiring to be accurately butted to its neighbor. The use of such short lengths is dictated clearly by the difficulty of using long lengths, and not, as suggested in GB 2 166 833A, because only short lengths, of a few meters, were available.

In any event, the problem is solved, according to GB 2 166 833A, by first slitting the foam sheath along its length and introducing the bundle via the slit, which is then adhesively repaired. This solution has in fact been widely adopted.

Difficulties occasionally arise in practice with this method, when the repaired slit constitutes a continuous line of impaired thermal resistance along which condensate can form in considerable quantity. The condensate then drips from the outer wrapping of the python and has obvious deletrious effects on the structure through which the python passes.

SUMMARY OF THE INVENTION

The invention provides a method of making a python in which a bundle of tubes is disposed substantially coaxially within a close-fitting elongated sheath having a resiliently expandable inside diameter. The method provides for pneumatically differentially pressurizing the inside of the sheath substantially throughout its length relative to the outside of the sheath with a greater relative pressure on the inside thereof thereby expanding the inside diameter of the sheath. The bundle of tubes is inserted longitudinally into the expanded sheath without substantial resistance from sliding contact with the expanded inside surface of the sheath. The differential pressure on the sheath is then relieved so that the inside diameter of the sheath contracts resiliently and closely around the bundle of tubes.

In one form of the method an elongated length of the sheath is displaced laterally with respect to its axis into an elongated chamber through an elongated opening therein with opposite end portions of the sheath projecting from opposite ends of the elongated chamber. The inside diameter of the opposite end portions of the sheath projecting from the opposite ends of the elongated chamber are mechanically expanded. The opposite ends of the elongated chamber are pneumatically sealed around the respective projecting opposite end portions of the sheath. The elongated opening in the chamber through which the sheath entered is also pneumatically sealed. The chamber is pneumatically evacuated to expand the inside diameter of all of the sheath not already mechanically expanded at its end portions. The bundle of tubes is then inserted longitudinally into the expanded sheath by access through the sheath end portions projecting from the ends of the chamber. The vacuum within the chamber is then relieved so that the inside diameter of the sheath therewithin contracts resiliently around the bundle of tubes. The opposite end portions of the sheath are unsealed with respect to the opposite ends of the chamber and the opening in the chamber is also unsealed. The expanded inside diameter of the opposite end portions of the sheath is mechanically released so that they also contract resiliently around the bundle of tubes. Finally, the elongated length of sheath with the tube bundle therewithin is laterally displaced with respect to its axis out of the chamber through the opening.

In another form of the method a forward portion of the sheath is pneumatically sealed. A streamlined pig is located on a lead end of the bundle of tubes. The pig and the lead end of the bundle of tubes are then inserted longitudinally into an entry end portion of the sheath opposite the forward portion thereof. That entry end portion of the sheath is then pneumatically sealed around the bundle of tubes without preventing longitudinal displacement of the bundle of tubes. The interior of the sheath is then pressurized to expand its inside diameter. The bundle of tubes is longitudinally displaced through the sheath from the entry end portion to the forward portion thereof by pulling or pushing without substantial resistance from sliding contact with the expanded inside surface of the sheath. The pressure on the inside of the sheath is then relieved so that the inside diameter of the sheath contracts resiliently and closely around the bundle of tubes.

BRIEF DESCRIPTION OF THE DRAWINGS

Figure 1:
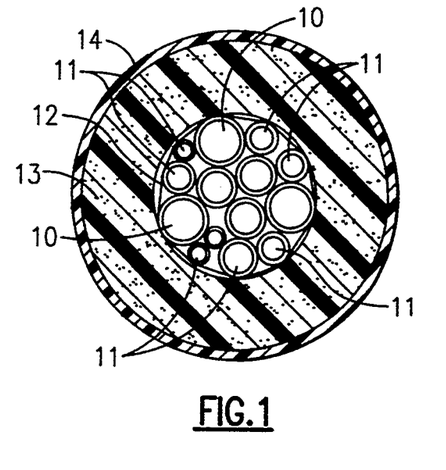
FIG. 1 is a cross section of a python.

FIG. 1 illustrates in cross-section a python as may be used for conveying beverages from a cellar or cold store to a bar in a public house, hotel, restaurant or like establishment.

The python comprises a flexible bundle of tubes 11 which may be of various sizes and which are usually color and/or number coded. Larger tubes 10 may be used for circulating water or other coolant.

The tubes 11 are wrapped in a bundle by for example a cling film wrapping 12 and are encased in a soft, flexible and resilient foam sheath 13 which is in turn wrapped in a protective plastics material outer wrapping 14. The tubes 11 are of a food grade polymer material such as polyethylene.

Such a python is known per se, but difficulty was experienced in threading the tube bundle through the sheath 13 and this could only be done in short lengths of a few meters and with the aid of talc as a lubricant. To solve that problem the tubular sheath 13 was first slit lengthwise and then opened out so it could be placed around the tube bundle. The slit was then repaired by adhesive prior to wrapping the now sheathed tube bundle in the protective wrap 14. This then gave rise to the further problem, however, that the insulation afforded by the repaired slit was inadequate and condensation would form along the length of the python at the position where the repaired slit underlay the protective wrap 14. The condensation would drip off and cause damage to woodwork and decoration in the property in which the python was installed.

The present invention provides that pythons as illustrated in FIG. 1 can be made in long lengths—20 or 25 meters is a convenient length of sleeve and several sleeves may be applied at once to make a really long python, say 100 meters long, which is standard, or even longer—with relatively few butt joints between sheath sections. In fact, the limitation is the available length of sheath material, but in practice, perhaps, it is just not convenient to work in lengths greater than 25 meters of sheath because of space limitations.

Figure 2:
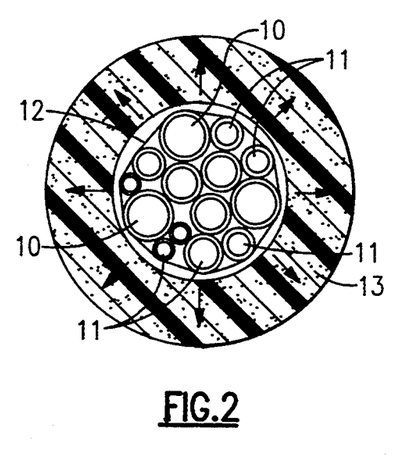
FIG. 2 is a cross section of a sheath and bundle of tubes during the introduction of the latter according to the invention.

The method is illustrated simply in FIG. 2, which shows the bundle of tubes 11 wrapped in cling film 12 being introduced into a foam sheath 13 which has had its internal diameter expanded as illustrated by the arrows. Once the wrapped bundle is in place, the expansion force is relieved and the foam sheath reverts to its original internal diameter to closely surround and grip the bundle. The outer wrapping 14 of FIG. 1 can then be applied conventionally.

While other expansion methods may be possible pneumatic expansion is certainly effective.

Figure 3:
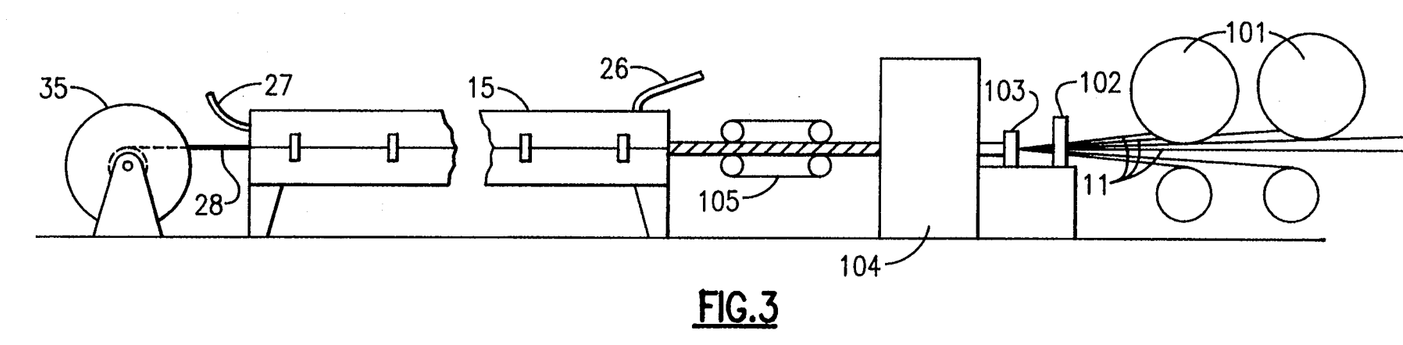
FIG. 3 is a diagrammatic illustration of an assembly line for making a python.

FIG. 3 illustrates diagrammatically an assembly line for python in which the sheath's inner diameter is expanded pneumatically.

Figure 5A:
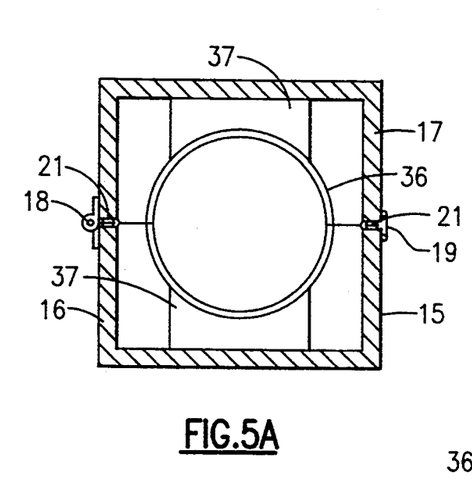
FIG. 5A is a cross section through the chamber of FIG. 4A.
Figure 5B:
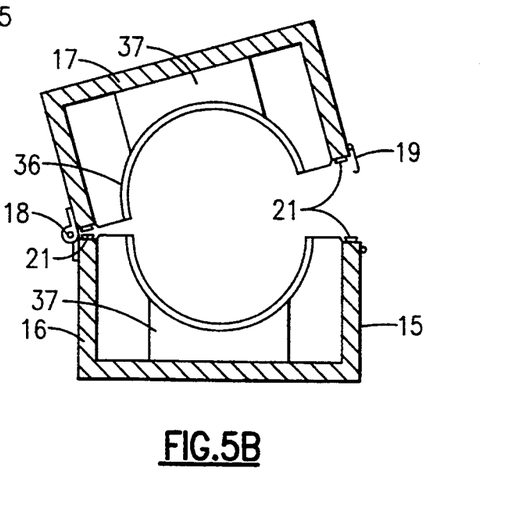
FIG. 5B is a cross section like FIG. 5A, but with the chamber open.

A length of sheath material 13 is placed in a sealable chamber 15 in the form of a lidded box as seen more clearly, perhaps, in the cross sections of FIGS. 5A and 5B, the box comprising a base 16 and a lid 17 secured thereto by a piano hinge 18. A clasp fastening arrangement shown at 19 in FIGS. 5A and 5B holds the lid firmly closed onto the base, the rim being sealed as by rubber or like sealing beading 21. The box has end closures which have apertures to allow the sheath to protrude slightly from each end.

Figure 4A:
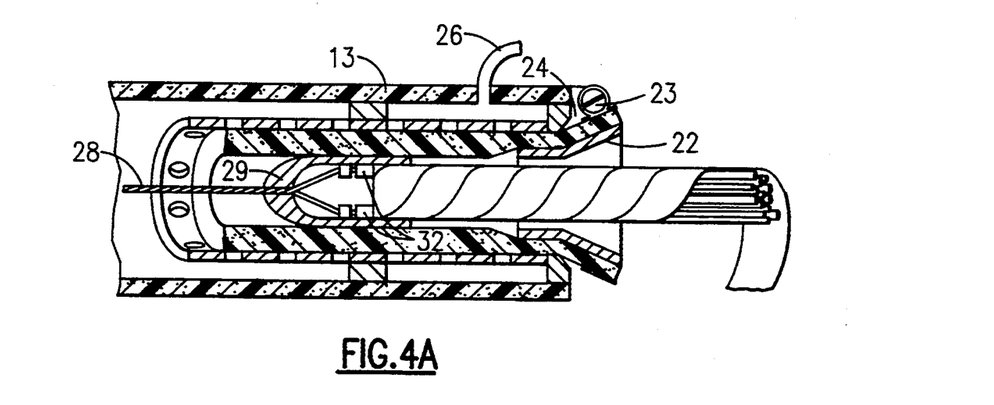
FIG. 4A is a longitudinal section through an end of a chamber of the assembly line illustrated in FIG. 3.
Figures 4B, 5C:
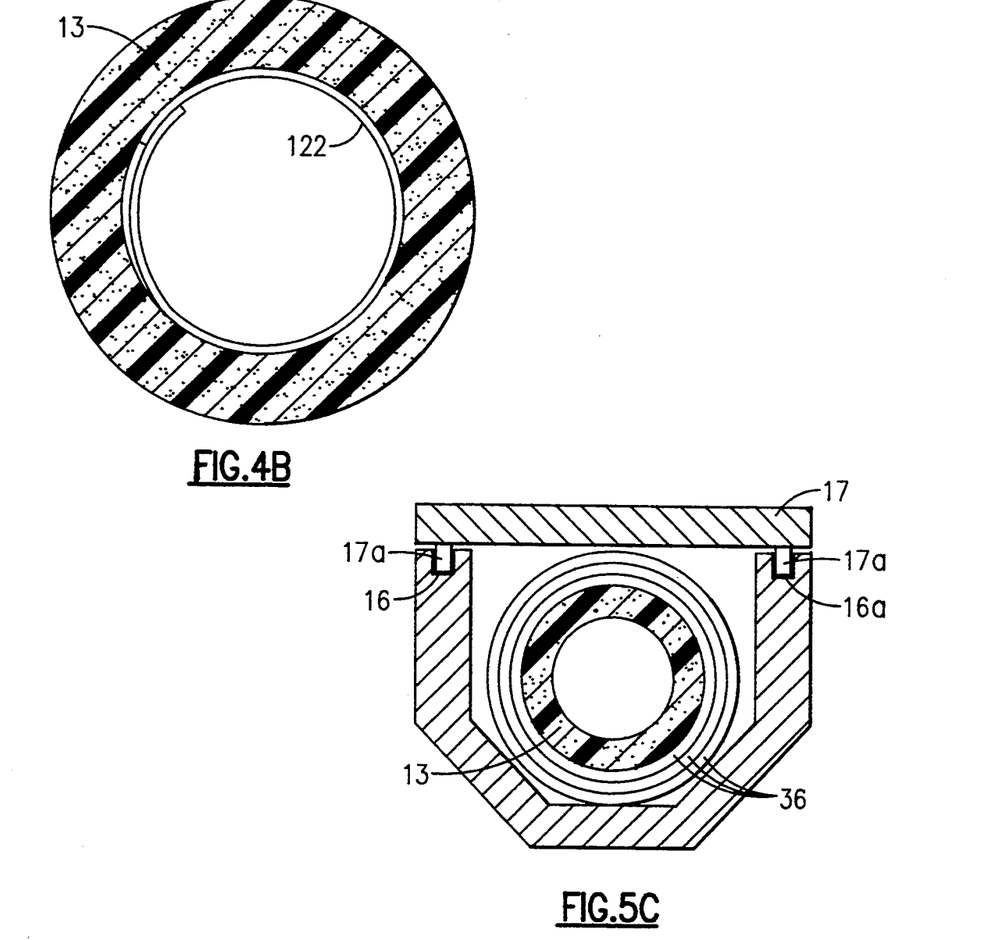
FIG. 4B is a cross section through a spring python end expander.
FIG. 5C is a cross section like FIG. 5A and FIG. 5B of a chamber with a lift-off lid.

In another arrangement illustrated in FIG. 5C, the lid 17 is lift-off rather than hinged and sits with feet 17a in wells 16a of the base 16 which is in this case of a more profiled cross section to reduce the internal space from which air has to be evacuated.

The box can conveniently be made in a length of 25 meters, to accommodate a similar length of sheath.

At the right-hand inlet end of the box 15, the sheath protrudes over a funnel 22 which is split into two halves so that it can be applied and removed laterally without threading over an end of the sleeve, for reasons which will become clear later. The sheath end is clamped to the funnel 22 e.g. by a hose grip type of clamp 23.

The funnel 22 expands the end of the sheath and is pushed sealingly into the aperture 24 in the end enclosure 25 of the box 15.

An alternative to the funnel is shown in FIG. 4B. A sheet metal spring 122 is reduced in diameter by squeezing, and inserted into the free end of the sheath, then let go. The sheet metal spring expands, expanding with it the sheath.

The other end of the sheath where it protrudes from the left hand end of the box 15 is also sealed, so that the box chamber 15 is adequately sealed all around.

The idea, now, is that with the sheath 13 sealed in the sealed box 15, its internal diameter is pneumatically expanded. To this end, the box 15 is evacuated through a vacuum connection 26. Alternatively, or at the same time, an overpressure may be introduced to the interior of the sheath in a manner described hereinafter through a connection 27 at the left end of the box.

The pressure air connection 27 can, before sealing off, be used to blow through the installed sheath 15 a butterfly-type carrier (not shown) for a hauling line 28 which will be attached to haul the bundle of tubes through the sheath.

In any event, the differential pressure from inside to outside the sheath is such as will cause the wall of the sheath to compress and indeed to cause the internal diameter of the sheath 15 to expand by some 5 mm, to the condition illustrated in cross-section in FIG. 2. In this condition there is no substantial frictional resistance to the passage of the tube bundle through the sheath.

The diameter of the funnel is chosen appropriately to the diameter of the sheath to ensure good sealing relationship. Different funnel configurations and sizes might be used in connection with the process described herein.

The leading end of the tube bundle to be inserted in the sheath is attached to a pig 29 for guiding its passage thorough the sheath. The pig 29 is hauled through the sheath by the hauling line or cable 28 which is on a winch situated at the end of the box 15. The cable 28 is attached to the end of the bundle of tubes 11 by two stepped locking inserts 32, better seen in FIGS. 6 and 7. A larger diameter such insert 32a is inserted into a larger tube and a smaller such insert 32b is inserted into a smaller tube 11. Hauling wire or cable 28 is introduced into a free end bore 33 of the insert, which is cut away so as to expose a lateral bore aperture 34 through which the hauling wire or cable 28 can be pulled and, to secure the wire or cable, can be knotted. The two wires are quickly spliced to become one which passes through bore 29a in the nose of the pig 29.

Figure 6:
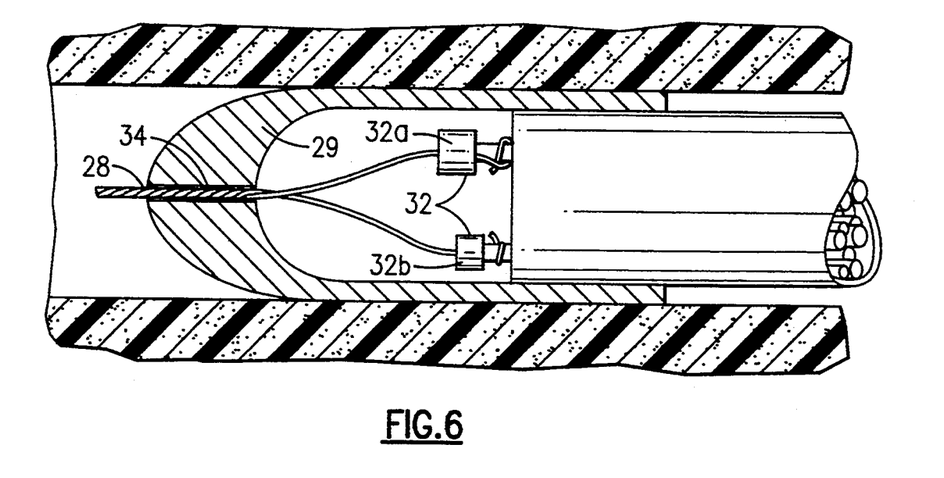
FIG. 6 is a longitudinal section through a pig used in a method.
Figure 7:
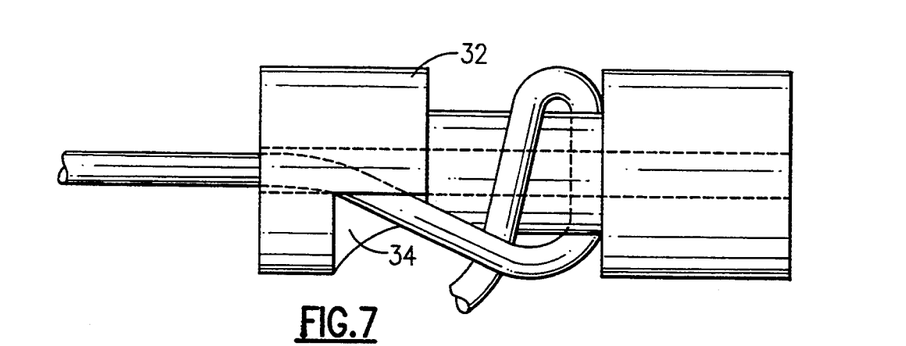
FIG. 7 is a longitudinal section through a stepped locking insert fastening for the tube bundle.

The pig 29 itself is a bullet shaped member having a rearwardly open cavity into which the leading end of the tube bundle fits. The pig 29 is thus slightly larger in diameter than the tube bundle, but not so big as to give rise to excessive frictional drag against the inner wall of the expanded sheath.

With the hauling wire or cable 28 through the sheath, the leading end of the wrapped bundle of tubes 11 in the pig 29 and the pig in the funnel 22, the box 15 is evacuated to expand the inner wall of the sheath 13 and the pig is hauled through the sheath by a winch 35.

As mentioned above, several cross-sectional sizes of tube bundles are often specified which fit into one of the standard range of sheaths. To accommodate the range, the apparatus includes a corresponding range of box 15 inserts 36 comprising different diameter apertured or perforated tubes which in use closely surround the sheath 13 in the box. The inserts 36 are, like the box 15 itself, hinged so as to open and close with the box 15. The inserts 36 are supported and held in position when in the box 15 on shaped blocks 37. In FIG. 5C nested inserts 36 are shown—the larger diameter inserts 36 are left in place, the smaller ones inserted inside them, which further reduces the free volume in the box and the pressure air or evacuation requirement.

Figure 8:
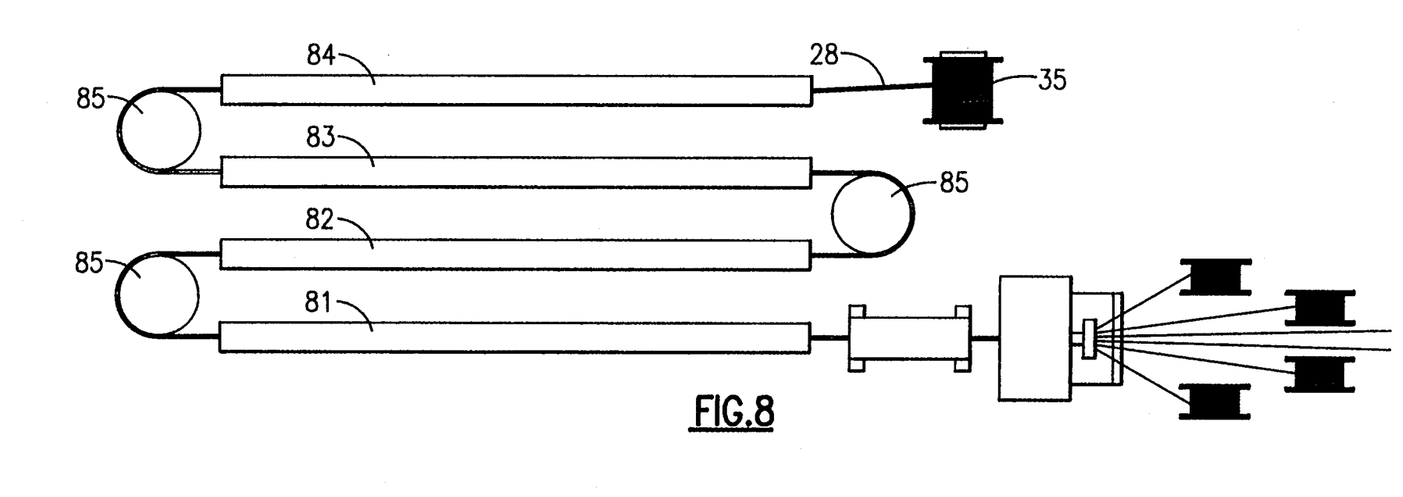
FIG. 8 is a diagrammatic plan view of an assembly line for making a longer python.
Figure 9:
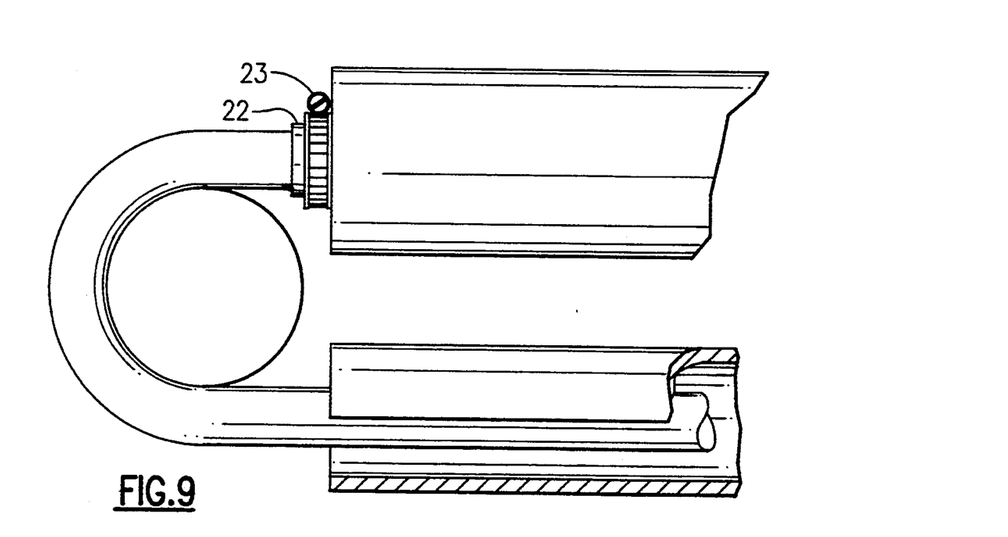
FIG. 9 is a part-sectional partial plan view of the assembly line of FIG. 8 at a stage of the method.

The apparatus illustrated in FIG. 3 can conveniently insert a wrapped bundle of tubes into a 20 or 25 meter length of sheath. For pythons longer than this the wrapped tube bundle is inserted serially into two or more, usually four, such lengths of sheath to make a python fifty or one hundred meters in length. This can be done as shown in FIG. 8 in which four similar evacuable boxes 81, 82, 83, 84 are set side-by-side. Lengths of, say, 25 meters of sheath 13 are placed in each box, each with a clamped funnel as described above.

The winch 35 is placed at the end of one 84, of the boxes. Between each adjacent pair of boxes is a capstan 85 around which the hauling line 28 can bend so that it can follow a serpentine path through the four boxes.

With the hauling line 28 so threaded through all of the sheaths 13 in the boxes 81, 82, 83, 84 the pig 29 is attached to the leading end of the tube bundle as already described. The boxes are evacuated to expand the inner diameter of its sheath 13 and the pig 29 hauled through until the required length of tube bundle has traversed the funnel of box 81. This is indicated e.g. by a mark placed on the wrapped bundle as it is being supplied (assumedly for present purposes from a continuous supply).

The sheath 13 of the box 81 will now be correctly positioned on the wrapped tube bundle and is now fixed in place by releasing the vacuum in box 81 so that the foam sheath resiles back to its original size which is adequate to grip the wrapped bundle and maintain its position on it. The funnel can now be removed.

Because of the half turns around the capstans 85, however, the tube bundle still has not reached the exit end of the box 84. Hauling now continues until the leading edge of the sheath from box 81 abuts the tail end of the sheath of the box 82, the sheathed bundle now bending around the capstan 85 between boxes 81 and 82. The funnel in the tail end of the box 82 at this stage prevents actual contact between the adjacent butt ends, but this can be removed (being split) once the vacuum is lifted from the box 82 and the sheath therein returns to its original, unexpanded condition wherein it grips the tube bundle, as before.

This process is repeated for the other two boxes 83, 84 until all of the sheaths are in abutting relationship when they may be adhesively secured together at their butt ends.

The finished assembly is then wrapped in a protective cover in the normal way.

The tube bundle is, as illustrated, assembled continuously with the sheathing thereof according to the invention. Individual tubes 11 are withdrawn from a creel or drum support arrangement 101 (FIGS. 3 and 8) through a collecting guide comb 102 and a bundle forming die 103 and from there pass to a cling-film wrapping machine 104 (of conventional type). The wrapped bundle is fed from there into the box 15 (or the first box 81, FIG. 8) by a caterpillar track-like belt feeder 105.

Figure 10:
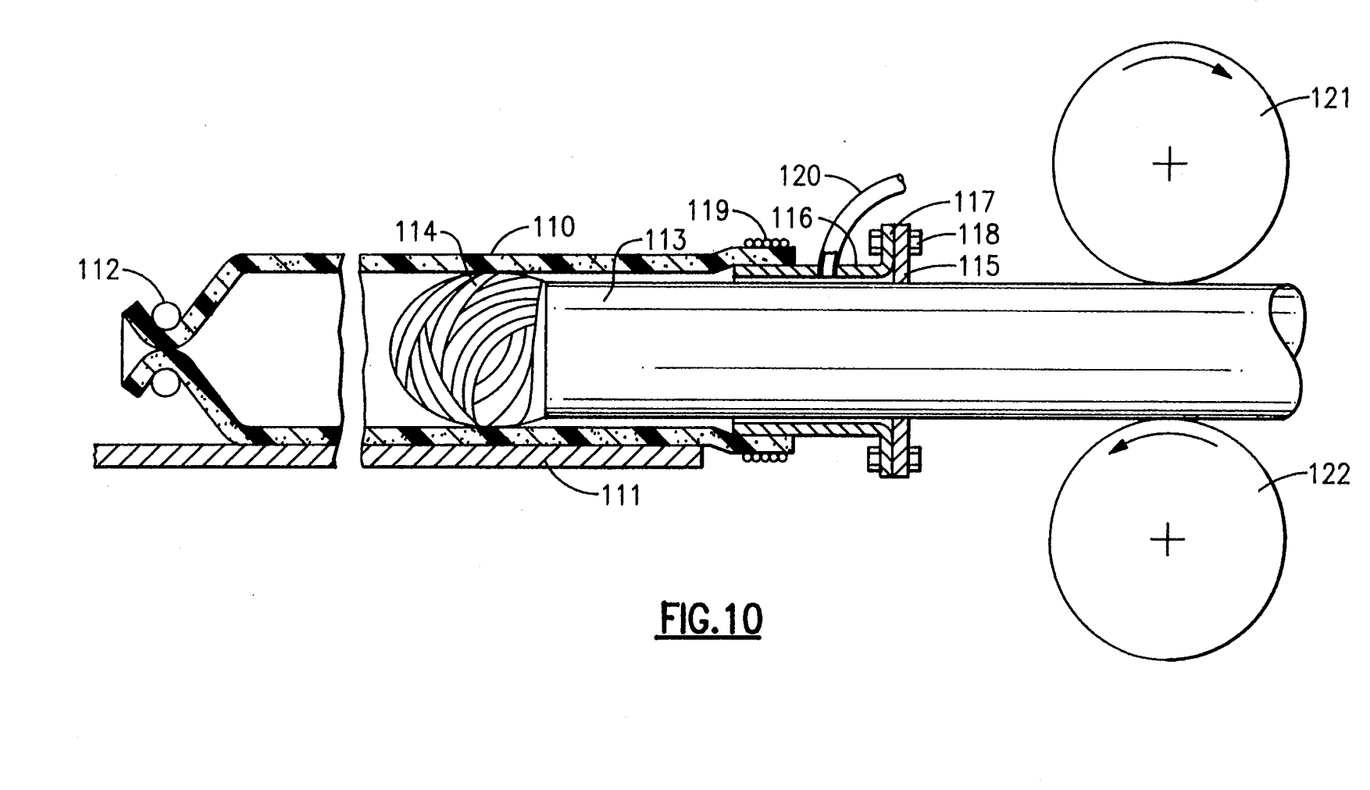
FIG. 10 is a schematic illustration of one manner of practicing the method of the invention to expand the sheath by internal pressure rather than by an external vacuum wherein the bundle is pushed through the sheath.

Referring now to FIG. 10 means are somewhat schematically shown for pressurizing the interior of a sheath 110 to expand its inside diameter.

An extended length of a sheath 110, perhaps 50 meters or more, is laid in a gutter-type support 111 or other similar support. A forward end of the sheath 110 is pneumatically sealed by a suitable tie-off or clamp 112.

A pig 114 is provided on the lead end of the tube bundle 113 to smooth the passage of the cut end of the bundle 113 through the sheath 110. Without such streamlining the square-cut ends of the outer tubes of the bundle 113 would tend to snag on the inside of the foam of the sheath 110. The construction of the pig 114 may be quite simple, as for example a wrapping of tape around the end of the bundle 113 to cover the sharp edges of the outer tubes. Alternatively the pig 114A could be a separate bullet-shaped part of plastic or metal suitably affixed to the end of the bundle, such as the pig 29. In any case the pig 114A is preferably of slightly larger diameter than the outside diameter of the bundle 113 as shown in FIG. 10. Not only does it guide the passage of the end of the bundle through the sheath but it may also serve as means for pneumatically sealing off the exposed tube ends. Also the pig 114 may itself form a pneumatic seal forward of the entry end portion of the bundle to supplement or even replace the clamp 112.

A disc ring 115 is slipped over that lead end of the tube bundle 113 and the inside diameter of the ring 115 fits snugly enough about the tube bundle 113 to create a pneumatic seal but without preventing longitudinal displacement of the tube bundle 113 with respect to the ring 115. A collar 116 is then loosely fitted about the lead end of the tube bundle 113 and by a flange 117 it is abutted against the ring 115. The collar 116 and ring 115 are then secured together by fastening means 118 so that a pneumatic seal is created between them.

The pig 114 and the lead end of the tube bundle 113 are then forcibly inserted a short distance longitudinally into an entry end portion of the sheath 110 opposite the forward portion which is sealed by the clamp 112. The outside diameter of the collar 116 is sufficient to expand the end of the sheath 110, which is then wrapped about tightly by wire 119 or the like to create a seal between the collar and the tube bundle end. The inside diameter of the collar 116 is sufficiently large to create a clearance with respect to the tube bundle 113. By means of a suitable pressure line 120 extending through the collar 116 the interior of the sheath 110 is pressurized to expand its inside diameter slightly, creating a similar clearance about the pig 114 and the tube bundle 113.

The tube bundle 113 is then pushed longitudinally into the expanded sheath 110 from the entry end portion thereof to the forward portion thereof without substantial resistance from sliding contact with the expanded inside surface of the sheath 110. Pushing may be accomplished by drive rollers 121 and 122 or similar means. The pneumatic seal at the forward end of the sheath 110 may, if desired, be made at a sequence of points along the length of the sheath 110 as the lead end of the tube bundle 113 advances so that the length of the sheath requiring expansion by pressurization is kept to a minimum. When the lead end of the tube bundle 113 reaches the extreme forward end of the sheath 110 the pressure on the inside of the sheath is relieved so that its inside surface contracts into a close fit about the tube bundle. The short length of the sheath 110 which remains after the clamp 112 is removed is simply cut off and discarded. The pig 114 covering the exposed ends of the tubes at the lead end 114 thereof is removed and the ring 115 and the collar 116 are slipped off the opposite end of the tube bundle 113.

Figure 11:
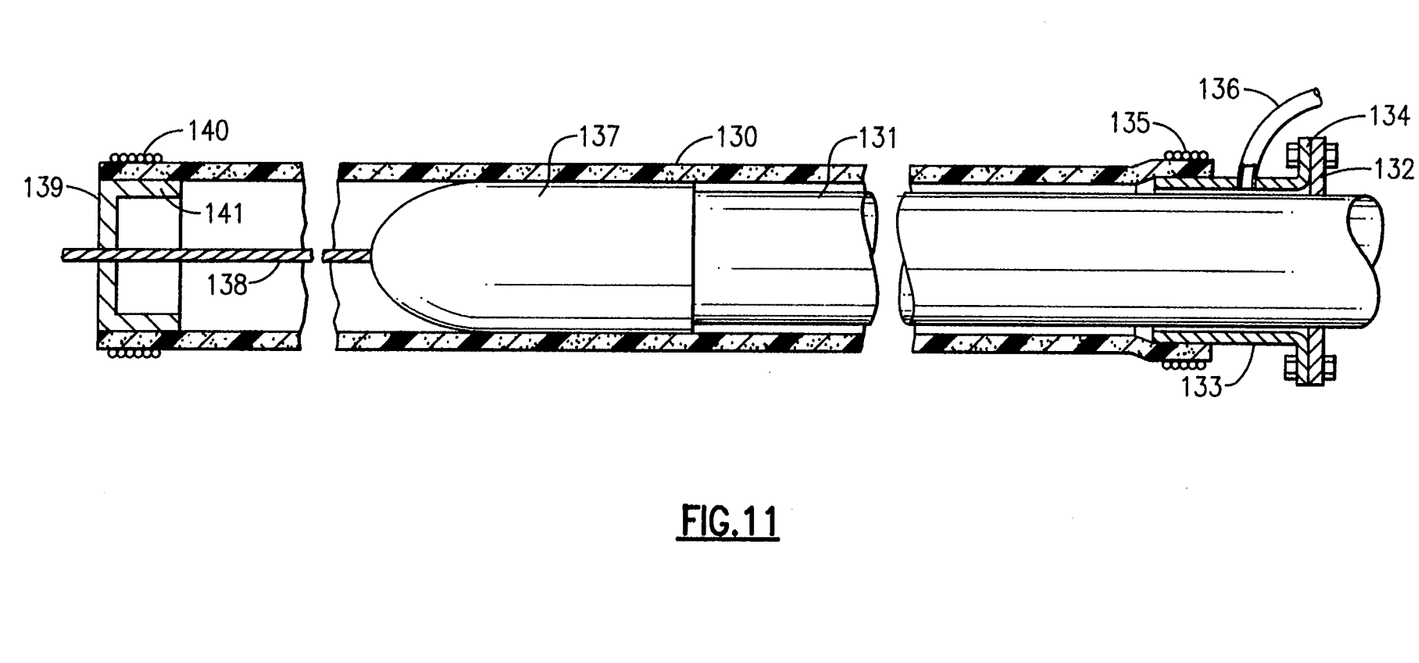
FIG. 11 is a schematic illustraton of another manner of practicing the method of the invention to expand the sheath by internal pressure rather than by an external vacuum wherein the bundle is pulled through the sheath.

FIG. 11 somewhat schematically illustrates another form of inserting into a sheath 130 a tube bundle 131. As in the FIG. 10 embodiment a ring 132 and a collar 133 with a flange 134 are fitted about a lead end of the bundle of tubes and by a wrapping of wire 135 the end of the sheath 130 is secured to the outside of the collar 133. This creates a pneumatic seal at the entry end portion of the sheath 130 around the bundle of tubes 131 without preventing longitudinal displacement of the bundle of tubes. A pressure line 136 is again provided.

A pig 137 is affixed to a lead end of the tube bundle 131 and a haul liine 138 is attached to the pig 137 and directed longitudinally through the sheath from its entry end portion to a forward end portion. At the forward end portion a ferrule 139 is inserted in the sheath 130 and with a wrapping of wire 140 around the end of the sheath a pneumatic seal is created between the inside of the sheath and a flange 141 on the ferrule 139. The haul lilne 138 extends through a close-fitting hole in the center of the ferrule 139 in a pneumatic sealing relationship but without preventing longitudinal displacement of the haul line.

The inside of the sheath is then pressurized through the pressure line 136 to expand and create a slight clearance around the pig 137. The haul line is then pulled from the forward end portion of the expanded sheath and the bundle of tubes is thereby drawn through the length of the sheath 130 without substantial resistance from sliding contact with the expanded inside surface of the sheath. The pressure on the inside of the sheath 130 is then relieved so that its inside surface contracts into a close fit about the bundle of tubes. The pneumatic seals are removed at both ends, the pig is detached from the lead end of the tube bundle and the assembly of the collar 133 and ring 132 are removed.

It is to be understood that none of the pneumatic seals in any of the foregoing embodiments need not be perfect. Some leakage of air can easily be tolerated so long as the means for pressurizing or suctioning can still create a pressure differential great enough to expand the inside diameter of the sheath to the slight degree needed to eliminate substantial resistance to movement of the tube bundle.

Other modifications and variations of these embodiments will be apparent to those skilled in the art and may be made without departing from the scope of the present invention as defined in the following claims.

I claim:

1. A method of making a python in which a bundle of tubes is disposed substantially coaxially within a close-fitting elongated sheath having a resiliently expandable inside diameter which comprises a) displacing an elongated length of said sheath laterally with respect to its longitudinal axis into an elongated chamber through an elongated opening therein with opposite end portions of the sheath projecting from opposite ends of said elongated chamber, b) mechanically expanding the inside diameter of said opposite end portions of the sheath projecting from the opposite ends of the elongated chamber, c) pneumatically sealing each of the opposite ends of the elongated chamber around the respective projecting opposite end portions of the sheath, d) pneumatically sealing said elongated opening in said chamber through which the sheath entered, e) pneumatically evacuating the chamber to expand the inside diameter of all of the sheath not already mechanically expanded at its end portions, f) inserting said bundle of tubes longitudinally into the expanded sheath by access through the sheath end portions projecting from the ends of the chamber, g) relieving the vacuum within the chamber so that the inside diameter of the sheath therewithin contracts resiliently around said bundle of tubes, h) unsealing the opposite end portions of the sheath with respect to the opposite ends of the chamber, i) unsealing the opening in said chamber, j) mechanically releasing the expanded inside diameter of the opposite end portions of the sheath so that they also contract resiliently around said bundle of tubes, and k) displacing the elongated length of sheath with the tube bundle therewithin laterally with respect to its longitudinal axis out of said chamber through said opening.

2. A method of making a python in which a bundle of a plurality of flexible plastic tubes with open lead ends is disposed substantially coaxially within a close-fitting elongated flexible sheath having a resiliently expandable diameter, the bundle of the plurality of tubes having a cross section other than circular and including peripheral and interior spaces among the tubes, which comprises a) locating a streamlined pig on a lead end of the bundle of flexible tubes with the pig being fitted about the outside of the bundle end and having a cross-sectional shape sufficient to cover all of the open tube lead ends and all peripheral and interior spaces among the tubes, b) inserting the pig and the lead end of the bundle of tubes longitudinally into an entry end portion of the flexible sheath, c) pneumatically sealing a portion of the sheath forward of the entry end portion, d) pneumatically sealing the entry end portion of the sheath around the bundle of flexible tubes without preventing longitudinal displacement of the bundle of tubes, e) pressurizing the interior of the sheath to expand its inside diameter, f) displacing the bundle of flexible tubes longitudinally through the sheath from the entry end portion without substantial resistance from sliding contact with the expanded inside surface of the sheath, and g) relieving the pressure on the inside of the sheath so that the inside diameter of the sheath contracts resiliently and closely around the bundle of tubes.

3. A method of making a python in which a bundle of a plurality of flexible plastic tubes with open lead ends is disposed substantially coaxially within a close-fitting elongated flexible sheath having a resiliently expandable diameter, the bundle of the plurality of tubes having a cross section other than circular and including peripheral and interior spaces among the tubes, which comprises a) locating a streamlined pig on a lead end of the bundle of flexible tubes with the pig being fitted about the outside of the bundle end and having a cross-sectional shape sufficient to cover all of the open tube lead ends and all peripheral and interior spaces among the tubes, b) pneumatically sealing a forward portion of the flexible sheath, c) pushing the pig and the lead end of the bundle of tubes into an entry end portion of the sheath opposite the forward portion thereof, d) pneumatically sealing the entry end portion of the sheath around the bundle of flexible tubes without preventing longitudinal displacement of the bundle of tubes, e) pressurizing the interior of the sheath to expand its inside diameter, f) pushing the bundle of flexible tubes longitudinally through the sheath from the entry end portion without substantial resistance from sliding contact with the expanded inside surface of the sheath, g) relieving the pressure on the inside of the sheath so that its inside surface contracts into a close fit about the bundle of flexible tubes without substantial radial compression of the sheath, and h) removing the pneumatic seals and entry end portions of the sheath.

4. A method according to claim 3 wherein the pig itself at least assists in effecting the pneumatic sealing of the sheath forward of the entry end portion.

5. A method acccording to claim 3 wherein the pig is a wrapping of tape around the lead end of the bundle of tubes.

6. A method according to claim 3 wherein the pig pneumatically seals the ends of the tubes at the lead end of the bundle.

7. A method of making a python in which a bundle of tubes is disposed substantially coaxially within a close-fitting elongated sheath having a resiliently expandable inside diameter which comprises a) inserting a haul line longitudinally through the sheath from an entry end portion thereof to a forward end portion thereof, b) pneumatically sealing the forward end portion of the sheath around the haul line without preventing longitudinal displacement of the haul line, c) attaching a lead end of the bundle of tubes to an end of the haul line projecting from the entry end portion of the sheath, d) inserting the lead end of the bundle of tubes into the entry end portion of the sheath, e) pneumatically sealing the entry end portion of the sheath around the bundle of tubes without preventing longitudinal displacement of the bundle of tubes, f) pneumatically pressurizing the inside of the sheath to expand its inside diameter, g) pulling the haul line from the forward end portion of the expanded sheath and thereby drawing the bundle of tubes therethrough without substantial resistance from sliding contact with the expanded inside surface of the sheath, h) relieving the pressure on the inside of the sheath so that its inside surface contracts into a close fit about the bundle of tubes, and i) removing the pneumatic seals at the forward and entry end portions of the sheath and detaching the haul line from the bundle of tubes.

* * * * *